United States Patent [19]

Katz

[11] 3,998,526
[45] Dec. 21, 1976

[54] LIQUID CRYSTAL DISPLAY DEVICE
[75] Inventor: Helmut Katz, Munich, Germany
[73] Assignee: Siemens Aktiengesellschaft, Berlin & Munich, Germany
[22] Filed: July 2, 1975
[21] Appl. No.: 592,522
[30] Foreign Application Priority Data
July 30, 1974 Germany ............ 2436658
[52] U.S. Cl. .................... 350/160 LC
[51] Int. Cl.² ..................... G02F 1/13
[58] Field of Search .............. 350/160 LC

[56] References Cited
UNITED STATES PATENTS

| 3,612,654 | 10/1971 | Klein | 350/160 LC |
| 3,645,604 | 2/1972 | Ngo | 350/160 LC |
| 3,841,083 | 10/1974 | Beigey | 350/160 LC X |

FOREIGN PATENTS OR APPLICATIONS 2,338,558  3/1974  Germany ............ 350/160 LC Primary Examiner—Edward S. Bauer
Attorney, Agent, or Firm—Hill, Gross, Simpson, Van Santen, Steadman, Chiara & Simpson

[57] ABSTRACT

A liquid crystal display screen having at least one liquid crystal cell and operating in a reflective mode of operation characterized by the screen having at least a pair of tandemly arranged chambers with all but one chamber being provided with transparent electrically conductive layers to provide electrode patterns for acting on liquid crystal material disposed therein, the remaining chamber being filled with a partially to completely reflecting medium which medium is inserted into the chamber while in either the gaseous or liquid state.

8 Claims, 1 Drawing Figure

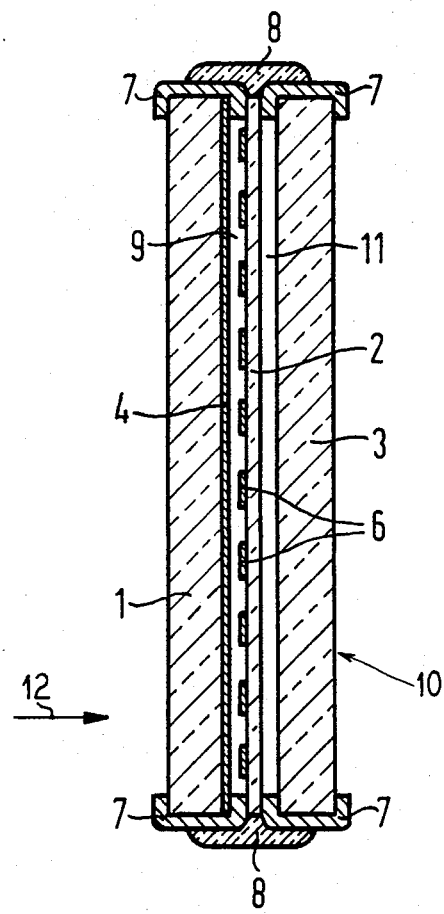

LIQUID CRYSTAL DISPLAY DEVICE

BACKGROUND OF THE INVENTION

1. Field of the Invention

The present invention relates to a liquid crystal screen having at least one liquid crystal cell and operating in a reflective mode.

2. Prior Art

Reflective liquid crystal display elements, the optical effect of the represented image can be simply improved by reflecting the oncoming light on a wall component which when considered from the position of the observer, lies at the rear of the screen. Reflectors suitable for this purpose have usually been provided in the form of a vapor-deposited layers of metal on a surface of a rear component or member of the display screen. However, two problems exist with using the metal layer. One of these problems is that the metal layer cannot be in contact with the material of the liquid crystal layer on account of a chemical reaction between the metal layer and the material which reaction would cause damage to the liquid crystal layer. The other problem is providing the layer as close as possible to the liquid crystal layer in order to reduce to a minimum any shading effects or parallax errors which would impair the clarity of the image when it is observed from the other side.

One solution to the above problems is to provide an insulating film which has a thickness of a maximum of 51 $\mu$m and which may consist of $SiO_2$ among other materials. This insulating film acts as electrode bearing transparent layer which is disposed between the liquid crystal layer and the reflective wall component. Such a solution is described in U.S. Pat. No. 3,612,654.

Instead of using an insulating film, it has also been suggested to use a self-supporting thin glass plate having a thickness of preferably 100–300 $\mu$m and which is reflective on a rear surface. Such a solution is suggested in a German Offenlegungsschrift 2 338 558.

Both of these screen devices have image representations which, even at large angles of observation, are clear, but nevertheless, these solutions involve a series of fundamental production based shortcomings. For example, as mentioned in the U.S. patent, the insulating film can only be applied in the requisite minimum thickness to the substrate by an expensive process. The thin glass carrier described in the above mentioned Offenlegungsschrift must be provided on one surface with the segmented electrodes and the other surface with the reflecting layer. Then the thin glass carrier is mechanically secured to a thicker glass plate by being pressed thereagainst at increased temperatures and pressures with a thermal plastically deformable synthetic intermediate layer interposed therebetween to hold or secure the two members together.

A liquid crystal display screen, which has a plurality of chambers which are arranged in a series and are separated from one another by glass plates have been suggested. An example is disclosed in U.S. Pat. No. 3,645,604. In these known arrangements, the chambers always form active liquid crystal cells and serve to produce a gray scale.

SUMMARY OF THE INVENTION

The present invention is directed to providing a reliable, mechanical sturdy liquid crystal display element or screen which supplies high contrast images, which can be easily recognized even when observed obliquely, and which screen can also be produced relatively cheaply.

To accomplish this task, the invention is directed to an improvement in a liquid crystal display screen having at least one liquid crystal cell and operating in a reflective mode, said screen having an outer transparent wall component coacting with a transparent thin wall component extending parallel and in spaced relationship thereto to form a chamber for a liquid crystal layer, said wall components having surfaces facing said layer provided with transparent electrically conducting coatings with at least one coating being an electrode pattern, and means for reflecting light disposed on a surface of the thin wall component facing away from the liquid crystal layer. The improvement comprises the thin wall component coacting with a second outer wall component to form a sealed chamber and the means for reflecting comprising a partially to completely reflecting medium disposed in the sealed chamber with said medium being inserted in the sealed chamber while in a gaseous or liquid state.

In this display screen, the optical contrast between the image and the background to the image is increased not as in the previously known devices by making the carrier faces reflective but by virtue of back scattering and reflecting of the light on a medium which fills a chamber. The medium at least when inserted in the chamber is in a liquid or gaseous state. When the background is in this form, the thin wall component which is provided with an electrode coating does not require any additional processes apart from having its edges secured to the other wall components. Furthermore, over considerable temperature ranges, the thin wall component and the reflective medium are relieved of mechanical load, are protected from external influences and are components of an overall fracture-proof stable display element.

Preferably, all the wall components should be of glass and their edges should be secured to one another using a glass solder. In such a type of construction, the chambers are hermetically sealed and are durable. The structure of the chamber also prevents thermal stresses from being applied to the display element.

Preferred examples of the reflecting medium are the use of a fluorescent liquid, a medium selected from a group consisting of metal and metal alloys which is inserted into the chamber in a liquid form and a high viscosity liquid such as oil which contains a finely dispersed deposited metal powder or other suitable light scattering and reflecting particles. In the embodiment utilizing a fluorescent liquid as the reflecting medium, the outer wall component forming the sealed chamber may be provided with a reflective coating. In the embodiment utilizing a metal or metal alloy, the metal or metal alloy is preferably either one such as mercury which is liquid at room temperature or one which has a low melting point.

BRIEF DESCIPTION OF THE DRAWINGS

The FIGURE is a cross-sectional view of an indicator screen in accordance with the present invention.

DESCRIPTION OF THE PREFERRED EMBODIMENT

The principles of the present invention are particularly useful when incorporated in a liquid crystal display screen generally indicated at 10 in the FIGURE.

The screen is illuminated from the left such as from the direction of the arrow 12 and is also observed from this direction.

The screen which is a single cell liquid crystal display screen comprises a front wall component or plate 1, a central thin wall component or foil 2 and a rear or second wall component or plate 3. All three wall components are preferably of glass plates having parallel extending surfaces. Mica could also be selected as the material for the thin wall component 2, but the thickness of the thin wall component should never be greater than approximately 500 μm.

The glass plate 1 is provided on the side facing the thin foil 2 with a transparent electrically conductive coating 4 and the thin plate 2 is provided on a front side facing the wall component 1 with a transparent electrical conductive coating which is in the form of a plurality of strip electrodes 6. The coating 4 may be also strip electrodes which extend perpendicular to the strips 6. Another example of electrode configuration is the coating 4 being a continuous coating with the coating on the thin member 2 being a segmented electrode of the desired pattern or configuration. In either type of electrode configuration, the electrically conducting coatings are transparent to light.

In order to maintain the desired distance between the thin wall component 2 and the front wall component 1 and the second wall component 3, the peripheral areas of the two outer plates 1 and 3 are gripped by a number of U-shaped metal clips 7 so that one leg of each clip is positioned between the individual plates forming the wall components. The peripheral area of the plates or the wall components 1, 2 and 3 and the metal clips 7, which space these apart, are secured to one another with glass solder 8. In this arrangement, the space between the individual plates 1, 2 and 3 form two hermetically sealed chambers 9 and 10. The front chamber 9 is filled with a layer of liquid crystal material and the rear chamber 11 is filled with the reflecting medium. A more detailed discussion of the production of liquid crystal display screens is contained in co-pending U.S. patent applications, Ser. Nos. 497,878 and 545,108.

The reflecting medium provided in chamber 11 may consist of a fluorescent liquid or gas. In this case, only a partial reflection or back scattering of the light which hits the medium in chamber 11 will occur. By the selection of the fluorescent medium having a suitable frequency-dependent absorption spectrum, it is possible to enable the image to be represented to appear even in front of a colored background which can be provided by a coating on the second wall component 3. A number of fluorescent materials or mixtures can be utilized. For example, a mixture of mercury vapor with either a Thallium, Silver, Lead, Sodium, Cadmium or Bismuth vapor. A discussion of fluorescent materials is given in Herman Franke, *Lexikon der Physik*, Frankh'sche Verlagshandlung, Stuttgart, 1969, page 507. Independent of the concrete absorption profile, the backscattering or reflecting medium always strengthens the scattering intensity of the liquid crystal zones which zones are subject to the voltage, and thus strengthens the brightness of the picture or image being created. In certain circumstances the backscattering intensity could be further increased by providing the second or rear outer wall component with either a reflective coating or as a reflecting member.

Instead of filling the chamber 11 with a fluorescent liquid, it may be filled with a metal or metal alloy such as mercury which is introduced in a liquid form. If the rear surface of the thin wall component 2 is flat, the metal contacting this surfaces acts as a fully reflective reflector. It is not necessary that the reflecting medium remain in a gaseous or liquid form or state at room temperatures, as is the case with the use of mercury. Thus, other metals such as cadmium or tin or metal alloys having suitable low melting points, for example Wood's alloy (a melting point of approximately 70° C) can also be used.

Finally, the chamber 11 may be filled with a liquid having a high viscosity, for example an oil, which liquid contains a finely dispersed deposit or suspension of metal powders or other light scattering or reflecting particles.

The screen 10 illustrated in the FIGURE can be formed in such a manner that initially in the first step of production, the plates forming the wall components 1 and 2 are connected to one another. In the second step, the second outer wall component 3 is then attached to this unit. Finally, the liquid crystal layer and the reflecting medium are inserted into the chambers 9 and 11. With this assembly sequence, particularly after the first step, one has available an elementary liquid crystal cell which is suitable for a series of different operating modes, for example, transillumination or tandem reflection operation, and thus facilitates the rationalization of the production of a whole program of modes.

While the exemplary embodiment of the invention has been described as a display screen having a single liquid crystal cell and a chamber containing a reflective medium, the screen could have a plurality of series connected liquid crystal cells which are arranged in tandem. This is accomplished by providing additional thin wall components 2 between the outer two members 1 and 3 which additional thin wall members are spaced apart to provide additional sealed chambers.

While the display screen of the present invention was discussed as being illuminated by daylight, it can be illuminated from a source of artificial light. Finally, it is also possible to use other materials such as a phosphorescent medium instead of or in addition to the above mentioned reflecting medium in the rear chamber 11. The phosphorescence of suitable phosphors can be used to produce contrasts even in dark areas. For example, bright images, which are provided with daylight in front of a darker background, will appear at night as dark images in front of a bright background.

Although various minor modifications may be suggested by those versed in the art, it should be understood that I wish to employ within the scope of the patent granted hereon, all such modifications as reasonably and properly come within the scope of my contribution to the art.

I claim:

1. In a liquid crystal display screen having at least one liquid crystal cell and operating in a reflective mode, said screen having an outer transparent wall component coacting with a transparent thin wall component extending parallel and in spaced relationship thereto to form a chamber for a liquid crystal layer, said wall components having surfaces facing said layer provided with transparent electrically conductive coatings with at least one coating being in an electrode pattern, and means for reflecting light disposed on a surface of the thin wall component facing away from the liquid crystal layer, the improvement comprising said thin wall component coacting with a second outer wall component to form a sealed chamber, and said means for reflecting comprising a partially to completely reflecting medium disposed in the sealed chamber, said medium being inserted into the sealed chamber while in the gaseous or liquid state.

2. In a liquid crystal display screen according to claim 1, wherein each of the wall components consist of glass and are held in parallel spaced relationship by a plurality of U-shaped members engaging the edges of the components and wherein the chambers are hermetically sealed by glass solder securing the edges of the wall components together.

3. In a liquid crystal display screen according to claim 1, wherein the medium is a fluorescent liquid.

4. In a liquid crystal display screen according to claim 3, wherein the second outer wall component is provided with a reflective metal layer.

5. In a liquid crystal display screen according to claim 1, wherein the reflective medium is selected from a group consisting of metal and metal alloys.

6. In a liquid crystal display screen according to claim 5, wherein said reflective medium is mercury.

7. In a liquid crystal display screen according to claim 5, wherein the medium is Wood's alloy.

8. In a liquid crystal display screen according to claim 1, wherein the reflective medium is a liquid of high viscosity containing finely dispersed deposits of metal powder.

* * * * *